US012331175B2

(12) United States Patent
Hwang et al.

(10) Patent No.: US 12,331,175 B2
(45) Date of Patent: Jun. 17, 2025

(54) POLYESTER FILM AND PREPARATION METHOD THEREOF

(71) Applicant: SK CHEMICALS CO., LTD., Gyeonggi-do (KR)

(72) Inventors: Da-Young Hwang, Gyeonggi-do (KR); Yoo Jin Lee, Gyeonggi-do (KR)

(73) Assignee: SK Chemicals CO., Ltd., Gyeonggi-do (KR)

( * ) Notice: Subject to any disclaimer, the term of this patent is extended or adjusted under 35 U.S.C. 154(b) by 0 days.

(21) Appl. No.: 18/771,379

(22) Filed: Jul. 12, 2024

(65) Prior Publication Data

US 2024/0368362 A1   Nov. 7, 2024

Related U.S. Application Data

(62) Division of application No. 17/422,699, filed as application No. PCT/KR2019/008312 on Jul. 5, 2019, now Pat. No. 12,071,525.

(30) Foreign Application Priority Data

Jan. 17, 2019  (KR) .......... 10-2019-0006446
Jul. 4, 2019    (KR) .......... 10-2019-0080466

(51) Int. Cl.
| | |
|---|---|
| C08J 5/18 | (2006.01) |
| B29C 48/00 | (2019.01) |
| B29C 48/08 | (2019.01) |
| B29C 55/00 | (2006.01) |
| B29C 55/14 | (2006.01) |
| B29C 71/02 | (2006.01) |
| C08G 63/183 | (2006.01) |
| C08G 63/80 | (2006.01) |
| C08L 67/02 | (2006.01) |
| B29K 67/00 | (2006.01) |
| B29L 7/00 | (2006.01) |

(52) U.S. Cl.
CPC ............ *C08J 5/18* (2013.01); *B29C 48/0018* (2019.02); *B29C 48/022* (2019.02); *B29C 48/08* (2019.02); *B29C 55/005* (2013.01); *B29C 55/14* (2013.01); *B29C 71/02* (2013.01); *C08G 63/183* (2013.01); *C08G 63/80* (2013.01); *C08L 67/02* (2013.01); *B29K 2067/003* (2013.01); *B29L 2007/008* (2013.01); *C08J 2367/02* (2013.01); *C08J 2467/02* (2013.01); *C08L 2205/02* (2013.01)

(58) Field of Classification Search
None
See application file for complete search history.

(56) References Cited

U.S. PATENT DOCUMENTS

| | | |
|---|---|---|
| 5,958,581 A | 9/1999 | Khanarian et al. |
| 6,025,061 A | 2/2000 | Khanarian et al. |
| 6,063,464 A | 5/2000 | Charbonneau et al. |
| 9,790,321 B2 | 10/2017 | Kulkarni et al. |
| 11,993,706 B2 | 5/2024 | Lee et al. |
| 2012/0226014 A1 | 9/2012 | Lee et al. |
| 2015/0148515 A1 | 5/2015 | Kim et al. |
| 2015/0197598 A1 | 7/2015 | Kim et al. |
| 2016/0168321 A1 | 6/2016 | Kulkarni et al. |
| 2016/0222157 A1 | 8/2016 | Lee et al. |
| 2019/0160728 A1* | 5/2019 | Higashioji ............... B29D 7/01 |
| 2020/0148816 A1 | 5/2020 | Lee et al. |
| 2020/0172662 A1 | 6/2020 | Lee et al. |
| 2022/0119602 A1 | 4/2022 | Hwang et al. |
| 2022/0380595 A1 | 12/2022 | Lee et al. |

FOREIGN PATENT DOCUMENTS

| | | |
|---|---|---|
| CN | 1298343 | 6/2001 |
| CN | 1298418 | 6/2001 |
| CN | 102498150 | 6/2012 |
| CN | 102666681 | 9/2012 |
| CN | 104334607 | 2/2015 |
| CN | 104334608 | 2/2015 |
| CN | 105392816 | 3/2016 |
| EP | 2573136 | 3/2013 |
| JP | H11-240962 | 9/1999 |
| JP | 2005-200516 | 7/2005 |
| JP | 2008-201838 | 9/2008 |
| JP | 2012-126821 | 7/2012 |
| JP | 2013-237171 | 11/2013 |
| JP | 2016-022667 | 2/2016 |
| KR | 10-0545285 | 1/2006 |
| KR | 10-2009-0073373 | 7/2009 |
| KR | 10-2016-0012158 | 2/2016 |
| KR | 10-2019-0001551 | 1/2019 |
| TW | 201116577 | 5/2011 |
| TW | 201434637 | 9/2014 |
| WO | WO 2014/100258 | 6/2014 |
| WO | WO 2014/100260 | 6/2014 |
| WO | WO 2018/236111 | 12/2018 |
| WO | WO 2019/004679 | 1/2019 |

OTHER PUBLICATIONS

English Translation of the International Search Report for International (PCT) Patent Application No. PCT/KR2019/008505, dated Oct. 30, 2019, 2 pages.

(Continued)

*Primary Examiner* — Sheeba Ahmed
(74) *Attorney, Agent, or Firm* — Sheridan Ross, PC

(57) ABSTRACT

The present disclosure relates to a polyester film and a preparation method of the same. Since the polyester film includes a resin layer formed from a mixture comprising a polyester resin, which includes a first diol moiety derived from isosorbide and a second diol moiety derived from cyclohexanedimethanol in a controlled ratio, and polyethylene terephthalate in a specific ratio, it is possible to exhibit improved heat resistance and adhesion with excellent light transmittance.

6 Claims, No Drawings

(56) References Cited

OTHER PUBLICATIONS

International Search Report and Written Opinion for International (PCT) Patent Application No. PCT/KR2019/008505, dated Oct. 30, 2019, 9 pages.
Extended Search Report for European Patent Application No. 19909753.6, dated Sep. 2, 2022, 9 pages.
International Search Report and Written Opinion for International (PCT) Patent Application No. PCT/KR2019/008312, dated Oct. 30, 2019, 8 pages.
English Translation of the International Search Report for International (PCT) Patent Application No. PCT/KR2019/008312, dated Oct. 30, 2019, 2 pages.
Extended Search Report for European Patent Application No. 19910782.2, dated Sep. 14, 2022, 8 pages.
Official Action for U.S. Appl. No. 17/422,683, dated Apr. 20, 2023 6 pages Restriction Requirement.
Official Action for U.S. Appl. No. 17/422,683, dated Sep. 18, 2023 10 pages.
Official Action for U.S. Appl. No. 17/422,699, dated Sep. 20, 2023 6 pages Restriction Requirement.
Official Action for U.S. Appl. No. 17/422,699, dated Dec. 22, 2023 10 pages.
Notice of Allowance for U.S. Appl. No. 17/422,699, dated Apr. 15, 2024 7 pages.

* cited by examiner

POLYESTER FILM AND PREPARATION METHOD THEREOF

CROSS-REFERENCE TO RELATED APPLICATION(S)

This application is divisional application of U.S. patent application Ser. No. 17/422,699, filed Jul. 13, 2021, which is a national-stage application under 35 U.S.C & 371 that claims the benefit of PCT Application No. PCT/KR2019/008312 having an international filing date of 5 Jul. 2019, which designated the United States, which PCT application claims the benefits of Korean Patent Applications No. 10-2019-0006446 filed on Jan. 17, 2019 and No. 10-2019-0080466 filed on Jul. 4, 2019 with the Korean Intellectual Property Office, the entire disclosures of each of which are incorporated herein by reference in their entireties. The present disclosure relates to a polyester film and a preparation method of the same.

TECHNICAL FIELD

Background Art

PET (polyethylene terephthalate), which is a representative example of a polyester resin, has been widely used as a material for optical films, electrical insulating films, packaging films, laminate films, and various protective films due to its low price and excellent mechanical/chemical/electrical properties. However, PET has poor heat resistance. Thus, a method of increasing heat resistance by a heat setting process at a high temperature is used to prepare a film using PET. However, when the PET film thus prepared is exposed to a high temperature for a long time, there is a problem that oligomers are precipitated on the surface of the film to crystallize, and as a result, transparency of the film is deteriorated. In order to prevent this, a method of adding a separate process such as coating has been proposed. However, there are problems that the preparation method is complicated, defects occur in post-processing, and contamination easily occurs. Usually, a molding process such as printing is performed on a film at a high temperature of about 80° C. for improving productivity. However, since PET has a low glass transition temperature of 80° C. or lower, the probability of defects is significantly increased when a molding process such as printing is performed at a high temperature. In addition, when PET has low chemical resistance to a solvent used for printing, transparency of the film is deteriorated, and surface defects are likely to occur. Further, PET exhibits high crystallinity, especially in biaxial stretching, and thus has a disadvantage in heat sealability. Accordingly, a PET film used for optics is required to have high transparency even in a high temperature process by having a low oligomer content. In addition, the PET film for printing is required to have high heat resistance and chemical resistance to exhibit excellent productivity. Particularly, for use in industrial or packaging applications, further studies are required for a polyester film exhibiting excellent adhesion and heat sealability by controlling crystallinity.

DETAILED DESCRIPTION OF THE INVENTION

Technical Problem

The present disclosure is to provide a polyester film exhibiting improved heat resistance and adhesion with excellent light transmittance.

The present disclosure is also to provide a preparation method of the above polyester film.

Technical Solution

According to an embodiment of the present disclosure, there is provided a polyester film including a resin layer formed from a mixture comprising polyethylene terephthalate and a polyester resin in a weight ratio of 90:10 to 10:90, wherein the polyester resin has a structure in which an acid moiety derived from a dicarboxylic acid or a derivative thereof and a diol moiety derived from a diol are repeated, and is characterized in that a content of a first diol moiety (a) derived from isosorbide and a content of a second diol moiety (b) derived from cyclohexanedimethanol with respect to 100 mol % of a total diol moiety derived from the diol satisfy the following Equation 1.

$$b \leq 18 \text{ mol } \% - a \qquad \text{[Equation 1]}$$

(In the above Equation, a is a content (mol %) of a first diol moiety derived from isosorbide and is 4 to 18 mol % with respect to 100 mol % of a total diol moiety derived from the diol in the polyester resin, and b is a content (mol %) of a second diol moiety derived from cyclohexanedimethanol.)

According to another embodiment of the present disclosure, there is provided a preparation method of the above polyester film.

Advantageous Effects

The polyester film of the present disclosure may exhibit improved heat resistance and adhesion with excellent light transmittance. Accordingly, the polyester film can be used in various applications such as industrial films, food container films, packaging films, optical films, insulating films, printing films, and adhesive films.

DETAILED DESCRIPTION OF THE EMBODIMENTS

Hereinafter, the polyester film and the preparation method thereof according to a specific embodiment of the present invention will be described.

The terminology used herein is for the purpose of describing particular embodiments only and is not intended to be limiting of the invention. The singular forms are intended to include the plural forms as well, unless the context clearly indicates otherwise. The terms "include", "comprise", and the like of the present disclosure are used to specify certain features, regions, integers, steps, operations, elements, and/or components, and do not exclude the existence or the addition of other certain features, regions, integers, steps, operations, elements, and/or components.

In addition, unless otherwise indicated in this disclosure, room temperature (RT) means 20±5° C.

According to an embodiment of the present disclosure, there is provided a polyester film including: a resin layer formed from a mixture comprising polyethylene terephthalate (resin A); and a polyester resin (resin B) that is different from the polyethylene terephthalate, in a weight ratio of 90:10 to 10:90, wherein the polyester resin (resin B) has a structure in which an acid moiety derived from a dicarboxylic acid or a derivative thereof and a diol moiety derived from a diol are repeated, and is characterized in that a content of a first diol moiety (a) derived from isosorbide and a content of a second diol moiety (b) derived from cyclohexanedimethanol with respect to 100 mol % of a total diol moiety derived from the diol satisfy the following Equation 1.

$$b \leq 18 \text{ mol \%} - a \qquad \text{[Equation 1]}$$

(In the above Equation 1, a is a content (mol %) of a first diol moiety derived from isosorbide and is 4 to 18 mol % with respect to 100 mol % of a total diol moiety derived from the diol in the polyester resin, and b is a content (mol %) of a second diol moiety derived from cyclohexanedimethanol.)

PET (polyethylene terephthalate), which is a representative example of a polyester resin, has low heat resistance, which limits its use. In addition, since the degree of crystallinity is high, adhesion during a heat sealing process may be lowered.

In order to solve these problems, a method of introducing isosorbide into a polymer main chain of an existing polyester resin has been proposed. Residues derived from isosorbide can lower regularity of the polymer chain, thereby reducing a crystallization rate of the resin. In order to ensure sufficient heat resistance and adhesion, the polyester resin should include a large amount of the diol moiety derived from isosorbide. However, the large amount of the diol moiety derived from isosorbide has caused a problem of not being able to function as a crystalline resin. Noncrystalline resins cannot be molded by stretching because of their low regularity of the molecular structure. Therefore, there was a limitation in the content of isosorbide that can be introduced into the polymer main chain of the polyester resin.

In order to overcome these technical limitations, the present disclosure uses polyethylene terephthalate (resin A), with a polyester resin (resin B) which includes a diol moiety (first diol moiety) derived from isosorbide (ISB) and a diol moiety (second diol moiety) derived from cyclohexanedimethanol (CHDM) in a controlled ratio, in a specific ratio for preparing a polyester film having improved light transmittance, heat resistance, and adhesion. Accordingly, the polyester film may be useful for optical films requiring high transparency, food container films or printing films requiring excellent heat resistance, and adhesive films and packaging films requiring high adhesion, by controlling crystallinity.

Specifically, in the polyester film according to an embodiment of the present disclosure, the polyethylene terephthalate (resin A) may include: polyethylene terephthalate (PET) obtained by polycondensing terephthalic acid and ethylene glycol; or a PET-based copolymer polyester resin in which a part of terephthalic acid is replaced by another dicarboxylic acid or a part of ethylene glycol is replaced by another diol. Specifically, examples of the other diol to replace a part of the ethylene glycol may include neopentyl glycol, 1,4-cyclohexanedimethanol, propylene glycol, tetramethylene glycol, and the like.

The polyethylene terephthalate (resin A) is different from a polyester resin (resin B) described later, and more specifically, may have a structure in which a diol moiety derived from a diol other than isosorbide as another diol is repeated.

The physical properties of the polyethylene terephthalate (resin A) may affect properties of the polyester resin film. Among various physical properties, a melting point may affect heat resistance of the polyester resin film. The melting point of polyethylene terephthalate (resin A) can be controlled by controlling the type and content of monomers and polymerization conditions. The polyethylene terephthalate (resin A) may have a melting point of 220 to 260° C., or 225 to 245° C., when measured using differential scanning calorimetry (DSC). By having the melting point within the above temperature range, the polyethylene terephthalate can further improve heat resistance when preparing a film by mixing with a polyester resin (resin B) described later.

In the polyester film according to an embodiment of the present disclosure, the polyester resin (resin B) is different from the polyethylene terephthalate (resin A). The polyester resin has a structure in which an acid moiety derived from a dicarboxylic acid or a derivative thereof and a diol moiety derived from a diol are repeated, and includes 4 to 18 mol % of a first diol moiety derived from isosorbide with respect to 100 mol % of a total diol moiety, and optionally a second diol moiety derived from cyclohexanedimethanol. When the polyester resin (resin B) further includes the second diol moiety derived from cyclohexanedimethanol, the second diol moiety is included in a content satisfying the condition of Equation 1 above.

Specifically, the polyester resin (resin B) is obtained by a polycondensation reaction after an esterification reaction or a transesterification reaction of a dicarboxylic acid or a derivative thereof, and a diol including isosorbide and optionally cyclohexanedimethanol. Accordingly, the polyester resin has a structure in which an acid moiety derived from a dicarboxylic acid or a derivative thereof and a diol moiety derived from a diol are repeated, and the diol moieties derived from isosorbide and cyclohexanedimethanol are included within the range satisfying the content condition of the Equation 1. That is, the polyester resin may include: 4 to 18 mol % of the first diol moiety derived from isosorbide with respect to 100 mol % of the total diol moiety (in this case, the content of a diol moiety derived from cyclohexanedimethanol is 0 mol %); or 4 to 18 mol % of the first diol moiety derived from isosorbide, and more than 0 and 14 mol % or less of the second diol moiety derived from cyclohexanedimethanol, wherein a total content of the first diol moiety and the second diol moiety is 18 mol % or less with respect to 100 mol % of the total diol moiety.

In the present disclosure, the acid moiety and the diol moiety refer to a residue that remains after polymerizing a dicarboxylic acid or a derivative thereof and a diol, and removing hydrogen, a hydroxyl group, or an alkoxy group therefrom.

The first diol moiety derived from isosorbide (1,4:3,6-dianhydroglucitol) is introduced into the polyester resin (resin B) to lower a crystallization rate. However, when the content is excessive, specifically, when the content exceeds 18 mol % with respect to 100 mol % of the total diol moiety constituting the resin, compatibility with polyethylene terephthalate is lowered to increase haze, and crystallinity may be significantly reduced to make stretching and heat setting difficult. When the content of the first diol moiety derived from isosorbide is less than 4 mol % with respect to 100 mol % of the total diol moiety, it is difficult to sufficiently improve heat resistance and adhesion, and haze may occur. The polyester resin (resin B) used in the present disclosure includes the first diol moiety derived from isosorbide within the content range of 4 to 18 mol %, or 5 to 16 mol % with respect to 100 mol % of the total diol moiety, thereby exhibiting improved heat resistance and adhesion while maintaining excellent light transmittance in the preparation of a film.

In addition, the polyester resin (resin B) may further include the second diol moiety derived from cyclohexanedimethanol in a content satisfying the Equation 1 above. Specifically, it may include the second diol moiety in the content such that a total content of the second diol moiety and the first diol moiety derived from isosorbide is 18 mol % or less with respect to 100 mol % of the total diol moiety.

The second diol moiety derived from cyclohexanedimethanol may be introduced into the polyester resin to improve light transmittance of the polyester resin. However, when the content exceeds a certain level, amorphousness of the polyester resin may be increased, so that stretching orientation may not be possible, and as a result, there is a risk of breakage in a stretching process. Accordingly, the second diol moiety derived from cyclohexanedimethanol may be included in a residual content such that the total content with the first diol moiety derived from isosorbide is 18 mol % or less with respect to 100 mol % of the total diol moiety, while satisfying the content condition of the first diol moiety. Specifically, the second diol moiety derived from cyclohexanedimethanol may be included in a content of 14 mol % or less, 10 mol % or less, or 5 mol % or less with respect to 100 mol % of the total diol moiety, or may not be included (0 mol %).

Specific examples of the cyclohexanedimethanol may include 1,2-cyclohexanediol, 1,4-cyclohexanediol, 1,2-cyclohexanedimethanol, 1,3-cyclohexanedimethanol, 1,4-cyclohexanedimethanol, and the like. A diol moiety derived from any one or a mixture of two or more thereof may be included in the polyester resin (resin B).

The polyester resin (resin B) may further include 82 to 96 mol %, or 84 to 95 mol %, of a diol moiety derived from a C2 to C12 aliphatic diol (third diol moiety), in addition to the diol moieties derived from isosorbide and cyclohexanedimethanol (first and second diol moieties) with respect to 100 mol % of the total diol moiety. The third diol moiety derived from an aliphatic diol may improve light transmittance of the polyester resin, decrease haze, and improve adhesion. However, when the content exceeds 96 mol %, adhesion may not be exhibited, and when the content is less than 82 mol %, haze may increase.

Specific examples of the aliphatic diol may include linear or branched aliphatic diols such as ethylene glycol, diethylene glycol, triethylene glycol, propanediol (1,2-propanediol, 1,3-propanediol, etc.), 1,4-butanediol, pentanediol, hexanediol (1,6-hexanediol, etc.), and neopentyl glycol (2,2-dimethyl-1,3-propanediol), and any one or a mixture of two or more thereof may be used. Among them, a third diol moiety derived from ethylene glycol, which can further improve light transmittance, may be included. According to an embodiment of the present disclosure, a content of a diol moiety derived from diethylene glycol may be 1 mol % or less, more specifically 0 mol %, or more than 0 mol % and 1 mol % or less, with respect to the total diol moiety in the polyester resin. When the content of the diol moiety derived from diethylene glycol is controlled to be within the above range in the polyester resin, heat resistance can be further improved.

In addition to the above-described diol moieties derived from isosorbide, cyclohexanedimethanol, and aliphatic diols (first to third diol moieties), the polyester resin (resin B) may further include a diol moiety derived from other diols (fourth diol moiety) such as a C7 to C12 alicyclic diol in a residual content.

More specifically, the diol moiety in the polyester resin consists of the first diol moiety derived from isosorbide, the second diol moiety derived from cyclohexanedimethanol, and the third moiety derived from aliphatic diols with respect to 100 mol % of the total diol moiety. Herein, the first diol moiety and the second diol moiety can be included in a content satisfying the Equation 1 above. More specifically, the diol moiety in the polyester resin may consist of 4 to 18 mol % or 5 to 16 mol % of the first diol moiety derived from isosorbide and 82 to 96 mol % or 84 to 85 mol % of the third diol moiety derived from ethylene glycol with respect to 100 mol % of the total diol moiety.

The term 'dicarboxylic acid or a derivative thereof' as used herein refers to one or more compounds selected from dicarboxylic acids and derivatives of the dicarboxylic acid. The term 'derivative of the dicarboxylic acid' refers to an alkyl ester of the dicarboxylic acid (lower alkyl ester having 1 to 4 carbon atoms such as monomethyl, monoethyl, dimethyl, diethyl, or dibutyl ester) or an anhydride of the dicarboxylic acid. Thus, for example, terephthalic acid or a derivative thereof is commonly called a compound that reacts with a diol to form a terephthaloyl moiety, such as: terephthalic acid; monoalkyl or dialkyl terephthalate; and terephthalic acid anhydride.

In the polyester film according to an embodiment of the present disclosure, the polyester resin (resin B) includes an acid moiety derived from a dicarboxylic acid or a derivative thereof together with the above-described diol moiety, wherein the dicarboxylic acid or the derivative thereof may be terephthalic acid or a derivative thereof. Specifically, terephthalic acid or a derivative thereof may be used alone as the dicarboxylic acid or the derivative thereof. Further, the dicarboxylic acid or the derivative thereof may be used by mixing the terephthalic acid or the derivative thereof with at least one selected from the group consisting of a C8 to C14 aromatic dicarboxylic acid or a derivative thereof and a C4 to C12 aliphatic dicarboxylic acid or a derivative thereof as the dicarboxylic acid or a derivative thereof other than the terephthalic acid or the derivative thereof. Examples of the C8 to C14 aromatic dicarboxylic acid or the derivative thereof may include aromatic dicarboxylic acids or derivatives thereof that are generally used in the preparation of a polyester resin, for example, a naphthalene dicarboxylic acid such as isophthalic acid, dimethyl isophthalate, phthalic acid, dimethyl phthalate, phthalic acid anhydride, and 2,6-naphthalene dicarboxylic acid, and a dialkylnaphthalene dicarboxylate such as dimethyl 2,6-naphthalene dicarboxylate, diphenyl dicarboxylic acid, and the like. The C4 to C12 aliphatic dicarboxylic acid or the derivative thereof may be a linear, branched, or cyclic aliphatic dicarboxylic acid or a derivative thereof commonly used in the preparation of a polyester resin. Examples thereof may include a cyclohexanedicarboxylic acid such as 1,4-cyclohexane dicarboxylic acid and 1,3-cyclohexane dicarboxylic acid, a cyclohexane dicarboxylate such as dimethyl 1,4-cyclohexane dicarboxylate and dimethyl 1,3-cyclohexane dicarboxylate, sebacic acid, succinic acid, isodecylsuccinic acid, maleic acid, maleic anhydride, fumaric acid, adipic acid, glutaric acid, azelaic acid, and the like.

The dicarboxylic acid or the derivative thereof may preferably be terephthalic acid, dimethyl terephthalate, or a mixture of terephthalic acid and isophthalic acid among the above-described compounds in order to ensure physical properties of the polyester resin (resin B) thus prepared and to improve the resin film.

The dicarboxylic acid or the derivative thereof may include 40 mol % or more, 50 mol % or more, 60 mol % or more, 70 mol % or more, 80 mol % or more, or 90 mol % or more of the terephthalic acid or the derivative thereof with respect to 100 mol % of a total dicarboxylic acid or a derivative thereof. The dicarboxylic acid or the derivative thereof may include 60 mol % or less, more than 0 mol % and 60 mol % or less, 0.1 to 55 mol %, 0.1 to 20 mol %, or 5 to 10 mol % of another dicarboxylic acid or a derivative thereof other than the terephthalic acid or the derivative thereof with respect to 100 mol % of the total dicarboxylic acid or the derivative thereof. A polyester resin with proper physical properties may be prepared within this content range.

Since the effect can be remarkably improved by controlling the type and content of the acid moiety and the diol moiety constituting the polyester resin, the acid moiety may consist of only the first acid moiety derived from terephthalic acid or a derivative thereof, or may consist of 40 mol % or more and 100 mol % or less, or 90 to 95 mol % of the first acid moiety derived from terephthalic acid or a derivative thereof, and more than 0 mol % and 60 mol % or less, or 5 to 10 mol % of the second acid moiety derived from a C8 to C14 aromatic dicarboxylic acid or a derivative thereof with respect to 100 mol % of the total acid moiety. The diol moiety may consist of 4 to 18 mol % of the first diol moiety derived from isosorbide, 14 mol % or less of the second diol moiety derived from cyclohexanedimethanol, and 82 to 96 mol % of the third diol moiety derived from aliphatic diols with respect to 100 mol % of the total diol moiety under the conditions satisfying the Equation 1 above.

In addition, the polyester resin (resin B) may further include at least one or more additives such as a polycondensation catalyst, a stabilizer, a coloring agent, a crystallizing agent, an antioxidant, or a branching agent added during the production process. Specifically, the polyester resin may further include at least one selected from the group consisting of 1 ppm to 300 ppm of a polycondensation catalyst, 10 ppm to 5000 ppm of a phosphorus stabilizer, 1 ppm to 300 ppm of a cobalt-based coloring agent, 1 ppm to 200 ppm of a crystallizing agent, 10 ppm to 500 ppm of an antioxidant, and 10 ppm to 300 ppm of a branching agent, based on a central metal atom. Specific examples and the content thereof will be explained in detail in the preparation method of a polyester resin below.

The polyester resin (resin B) having the composition as described above may control physical properties to exhibit a more excellent effect when applied to the resin film by controlling the type and content of the monomer, and polymerization conditions. Specifically, the polyester resin (resin B) may have an intrinsic viscosity of 0.50 to 1.00 dl/g measured at 35° C. after being dissolved in ortho-chlorophenol at a concentration of 1.2 g/dl at 150° C. for 15 minutes.

The intrinsic viscosity (IV) of the polyester resin (resin B) may affect processability and mechanical strength properties in the preparation of a film. An intrinsic viscosity of less than the above range may result in poor appearance during molding due to fast flow, and may not secure sufficient mechanical strength. Further, it may be difficult to achieve desired physical properties by high stretching. In addition, when the intrinsic viscosity exceeds the above range, a pressure of the extruder is increased due to an increase in viscosity of a molten material during molding, so that a coextrusion process may not be smooth. When a temperature of the extruder is raised to reduce the pressure, color and physical properties may be degraded due to deformation by heat, and process problems may occur due to a difference in shrinkage with a base layer in the stretching and heat treatment processes.

More specifically, the polyester resin (resin B) may have the intrinsic viscosity (or melt intrinsic viscosity) of 0.45 to 0.65 dl/g, or 0.50 to 0.60 dl/g, wherein the intrinsic viscosity is measured at 35° C. after dissolving a polymer obtained immediately after the esterification reaction or the transesterification reaction and the polycondensation reaction in ortho-chlorophenol at a concentration of 1.2 g/dl at 150° C. for 15 minutes. In addition, after the esterification reaction or the transesterification reaction and the polycondensation reaction, the intrinsic viscosity can be further increased through an additional crystallization process and a solid-phase polymerization reaction. The polymer obtained after the solid-phase polymerization reaction is dissolved in ortho-chlorophenol at a concentration of 1.2 g/dl at 150° C. for 15 minutes to measure intrinsic viscosity (or solid-phase intrinsic viscosity) at 35° C. This intrinsic viscosity (or solid-phase intrinsic viscosity) may be 0.10 to 0.40 dl/g, or 0.15 to 0.25 dl/g higher than the intrinsic viscosity (or melt intrinsic viscosity) of the polymer after the polycondensation reaction. Specifically, the solid-phase intrinsic viscosity after the crystallization and solid-phase polymerization reaction may be 0.6 to 1.0 dl/g, or 0.65 to 0.95 dl/g. When the solid-phase intrinsic viscosity is within the above range, a molecular weight distribution of the polyester resin is narrowed, thereby lowering a crystallization rate during molding. Accordingly, heat resistance and crystallinity can be improved without reducing transparency.

In the present disclosure, the intrinsic viscosity of the polyester resin can be calculated using Equations 2 and 3 below after measuring the time taken (efflux time; to) for a solvent to pass between certain internal sections of a viscosity tube, and the time taken (t) for a solution prepared by dissolving the polyester resin in the solvent to pass the tube, respectively.

The polyester film according to an embodiment of the present disclosure is formed from a mixture comprising the polyethylene terephthalate (resin A) and the polyester resin (resin B) in a weight ratio of 90:10 to 10:90, or 30:70 to 10:90. By including the polyethylene terephthalate (resin A) and the polyester resin (resin B) within the above mixing ratio, light transmittance, heat resistance, and adhesion of the resin film can be improved at the same time with good balance. When the content of the polyethylene terephthalate (resin A) is too high by exceeding the mixing ratio of 90:10, an improving effect of light transmittance and adhesion from the polyester resin (resin B) may be insignificant. When the content of the polyester resin (resin B) is too high by exceeding the mixing ratio of 10:90, it may be difficult to use due to a decrease in heat resistance and an increase in strain.

The polyester film may be an unstretched film or a stretched film. When the polyester film is an unstretched film, it is preferable to mix the polyethylene terephthalate (resin A) and the polyester resin (resin B) in a weight ratio of 30:70 to 10:90 to improve light transmittance while maintaining excellent heat resistance and adhesion.

In addition, when the polyester film is a stretched film, it may be a film stretched in at least one of a longitudinal direction and a transverse direction, specifically at a total stretch ratio of 2 to 15 times, or 4 to 12 times. When stretched at the above stretch ratio, heat resistance may be further improved.

More specifically, the polyester film may be a stretched film uniaxially stretched in any one of the longitudinal direction and the transverse direction, and a stretch ratio in a longitudinal direction or in a transverse direction may be 2 to 15 times, 4 to 12 times, or 5 to 10 times.

In addition, the polyester film may be a stretched film that is biaxially stretched in the longitudinal direction and the transverse direction, and a stretch ratio in the longitudinal direction may be 2 to 5 times, 2 to 4 times, or 2 to 3 times, and a stretch ratio in the transverse direction may be 2 to 7 times, 2 to 5 times, or 2 to 4 times. When stretched at the above stretch ratio, heat resistance may be further improved. Moreover, when the polyester film is the stretched film biaxially stretched in the longitudinal direction and the transverse direction, the stretch ratio in the longitudinal direction and the stretch ratio in the transverse direction may be the same or different. In addition, in the case of a biaxially stretched film in which the stretch ratios are different, the stretch ratio in the longitudinal direction may be smaller than the stretch ratio in the transverse direction, and the stretch ratios in the longitudinal direction and the transverse direction may satisfy the stretch ratio range described above, respectively.

In addition, the polyester film according to an embodiment of the present disclosure may further include at least one additive selected from the group consisting of a crystallizing agent, a sunscreen agent, an antistatic agent, an impact modifier, an antioxidant, and fine particles. The method of adding the additive is not particularly limited. For example, it may be added in the preparation of a polyester resin, or may be added by manufacturing a high concentration masterbatch of an additive, and diluting and mixing it.

For example, the polyester film may further include 5 to 200 ppm, or 100 to 200 ppm of a crystallizing agent with respect to a total weight of the polyethylene terephthalate (resin A) and the polyester resin (resin B). Examples of the crystallizing agent may include a crystal nucleating agent (silica, talc, aluminum hydroxide, boron nitride, etc.), an ultraviolet absorber (benzotriazole, benzophenone, salicylate, cyanoacrylate, oxanilide, a hindered amine light stabilizer (HALS), etc.), a polyolefin-based resin (polyethylene, polypropylene, etc.), a polyamide resin, and the like, and any one or a mixture of two or more thereof may be used. By further including the crystallizing agent within the above range, heat resistance may be further improved.

A thickness of the polyester film may be appropriately determined according to the use thereof, and may specifically be 1 μm to 2 mm. In the case of an unstretched film, the thickness may be 500 μm to 1 mm, and in the case of a stretched film, the thickness may be 1 μm to 350 μm.

In the present disclosure, the thickness of the polyester film can be measured using an optical microscope, and it means an average thickness, unless otherwise indicated.

Hereinafter, the preparation method of the polyester film will be explained in detail.

The polyester film according to an embodiment of the present disclosure may be prepared by including (a) a step of mixing polyethylene terephthalate (resin A) and a polyester resin (resin B) in a weight ratio of 90:10 to 10:90, followed by melt extrusion to prepare a polyester film including a resin layer formed from the polyethylene terephthalate (resin A) and the polyester resin (resin B), and optionally (b) a step of biaxially stretching the polyester film in a longitudinal direction and in a transverse direction at a temperature above a glass transition temperature of the polyester resin (resin B). Therefore, according to another embodiment of the present disclosure, there is provided a preparation method of the above polyester film.

In the preparation method of the polyester film according to an embodiment of the present disclosure, the step (a) is for preparing an unstretched polyester film from a mixture of polyethylene terephthalate (resin A) and a polyester resin (resin B). Herein, the polyethylene terephthalate (resin A) and the polyester resin (resin B) are as described above.

The mixing of the polyethylene terephthalate (resin A) and the polyester resin (resin B) in the step (a) may be carried out according to a conventional mixing process, except that each compound is used to satisfy the above-described mixing ratio conditions.

The melt extrusion in the step (a) may be carried out at a temperature of 240 to 310° C., or 250 to 300° C. When the temperature is less than 240° C., the polymer may not be melted. When it exceeds 310° C., it may be difficult to achieve desired physical properties, because thermal decomposition of the polymer increases and the film is damaged or broken during stretching of the film. Accordingly, the melt extrusion process may be performed at a relatively low temperature as in the above range, thereby minimizing the thermal decomposition of the polymer to maintain a long chain structure.

In addition, other additives may be optionally added to improve physical properties and effects of the polyester film to be prepared. The other additives are as described above, and may be added when the polyethylene terephthalate (resin A) and the polyester resin (resin B) are mixed to be extruded together.

As a result of the melt extrusion process, a sheet-shaped melt extrudate, which is an unstretched polyester film, can be prepared. The unstretched polyester film prepared in the step (a) may optionally be subjected to a cooling process to an appropriate temperature, and the cooling process may be carried out according to a conventional method.

As the unstretched polyester film prepared in the step (a) is formed from a mixture comprising the polyethylene terephthalate (resin A) and the polyester resin (resin B) in an optimum mixing weight ratio, it may exhibit excellent heat resistance and adhesion, in addition to high light transmittance and low haze.

In addition, when the polyester film according to an embodiment of the present disclosure is a stretched film, the preparation method of the polyester film may further include (step (b)) a step of stretching the unstretched polyester film prepared in the step (a).

The stretching process may be performed at a higher temperature than or equal to a glass transition temperature of the polyester resin (resin B), and specifically, at a temperature of 80 to 180° C., or 90 to 170° C.

In addition, the stretching process may be performed by biaxially stretching the unstretched polyester film in a longitudinal direction and in a transverse direction. Specifically, the unstretched polyester film may be biaxially stretched in a longitudinal direction at a stretch ratio of 2 to 5 times and in a transverse direction at a stretch ratio of 2 to 7 times. In addition, it may be stretched at a total stretch ratio of 5 to 7 times while satisfying the stretch ratios in the longitudinal direction and in the transverse direction. By stretching at the high stretch ratio as described above, heat resistance of the resin film to be prepared may be further improved.

In addition, the preparation method of the polyester film according to an embodiment of the present disclosure may further include (step (c)) a step of heat setting the polyester film obtained in the step (b) after the step (b).

The heat setting process in the step (c) may be performed according to a conventional heat setting method except for a temperature of 100 to 220° C. By performing the heat setting process within the above temperature range, it is possible to reduce strain by increasing crystallinity of the resin film to be prepared, and mechanical strength properties may be improved.

Meanwhile, the polyester resin (resin B) used in the step (a) is a polyester resin in which isosorbide is introduced in the above-described content.

In order to prepare the polyester resin (resin B), the preparation method of the polyester film may further include, before the step (a): a step of preparing the polyester resin (resin B) by a method including (a0-1) performing an esterification reaction or a transesterification reaction on a dicarboxylic acid or a derivative thereof and a diol including isosorbide; and (a0-2) performing a polycondensation reaction on a product obtained by the esterification or transesterification reaction to prepare a polyester resin having an intrinsic viscosity of 0.45 to 0.65 dl/g at 35° C. after being dissolved in ortho-chlorophenol at a concentration of 1.2 g/dl at 150° C. for 15 minutes.

The polyester resin (resin B) may be prepared in a batch, semi-continuous, or continuous manner, and the esterification reaction or the transesterification reaction of (a0-1) and the polycondensation reaction of (a0-2) may be carried out under an inert gas atmosphere.

In the preparation of the polyester resin (resin B), the isosorbide is used in the content such that a first diol moiety derived from isosorbide is 4 to 18 mol % with respect to 100 mol % of the total diol moiety derived from the diol of the prepared polyester resin. However, since some of the isosorbide may be volatilized or may not react during the synthesis of the polyester resin (resin B), the isosorbide may be used in a content of 1 to 35 mol, or 5 to 30 mol, with respect to 100 mol of the total dicarboxylic acid or the derivative thereof in order to introduce the isosorbide in the above-described content into the polyester resin (resin B). When the content of isosorbide exceeds the above range, yellowing may occur and crystallinity may be markedly reduced, which may be disadvantageous for the stretching and heat setting process. When the content is less than the above range, it may not exhibit sufficient heat resistance and adhesion, resulting in haze. However, a polyester film having excellent heat resistance, adhesion, and transparency may be provided by controlling the content of isosorbide within the above range.

In addition, when the polyester resin (resin B) further includes a second diol moiety derived from cyclohexanedimethanol, the cyclohexanedimethanol may be added in the content such that the second diol moiety satisfies the condition of Equation 1 above.

In addition, the content of a third diol moiety derived from an aliphatic diol introduced into the polyester resin (resin B) is not directly proportional to the content of the aliphatic diol used for the preparation of the polyester resin. However, the aliphatic diol may be used in a content of 90 to 120 mol, or 95 to 115 mol with respect to 100 mol of the total dicarboxylic acid or the derivative thereof in order for the polyester resin to include 82 to 96 mol % of the third diol moiety derived from the aliphatic diol with respect to 100 mol % of the total diol moiety derived from the diol constituting the polyester resin.

As described above, the polyester resin (resin B) may include a fourth diol moiety derived from an alicyclic diol in a residual content, in addition to the first diol moiety derived from isosorbide, the second diol moiety derived from cyclohexanedimethanol, and the third diol moiety derived from an aliphatic diol. The alicyclic diol may be added in the content such that the fourth diol moiety derived from an alicyclic diol is 0 to 10 mol %, or 0.1 to 5 mol % with respect to 100 mol % of the total diol moiety.

In the esterification reaction or transesterification reaction of (a0-1) for preparing the polyester resin (resin B), the dicarboxylic acid, or the derivative thereof and the diol react in a stoichiometric ratio, a molar ratio, of 1:1. However, the dicarboxylic acid or the derivative thereof and the diol may be added to the reactor in the content such that a molar ratio of the diol to 1 mol of the dicarboxylic acid or the derivative thereof (molar ratio of the diol/the dicarboxylic acid or the derivative thereof) is 1.01 or more.

For example, when a dicarboxylic acid is used as the dicarboxylic acid or the derivative thereof, an initial mixing molar ratio of the diol to the dicarboxylic acid may be adjusted to 1:1.01 to 1.5, or 1:1.05 to 1.3. When using a derivative such as a dicarboxylic acid alkyl ester or a dicarboxylic anhydride as the dicarboxylic acid or the derivative thereof, the initial mixing molar ratio of the diol to the derivative of dicarboxylic acid may be adjusted to 1:2.0 to 1:2.5, or 1:2.1 to 1:2.3.

In addition, the diol may be added to the reactor at one time before the polymerization reaction, or added during the polymerization reaction several times. According to a more specific embodiment, it is possible to prepare a polyester resin that satisfies a specific molecular weight distribution by adjusting the initial content of the dicarboxylic acid or the derivative thereof and the diol to a specific range at the initial stage of the reaction. Accordingly, it is possible to more effectively provide the polyester film of the embodiment and the polyester resin included therein. This initial mixing molar ratio may refer to a mixing molar ratio at the initiation of the polymerization reaction in the reactor, and the dicarboxylic acid or the derivative thereof and/or the diol may be further added during the reaction, if necessary.

In addition, the esterification or transesterification reaction of (a0-1) for the preparation of the polyester resin (resin B) may be carried out in a batch, semi-continuous, or continuous manner. Each raw material may be added separately, but it may preferably be added in a slurry form in which the dicarboxylic acid or the derivative thereof is mixed in the diol.

Further, a catalyst may be used in the esterification or transesterification reaction of (a0-1). Such catalyst may include: methylates of sodium and magnesium; acetates, borates, fatty acids, carbonates, or alkoxy salts of Zn, Cd, Mn, Co, Ca, Ba, Ti, and the like; metals such as Mg; and oxides of Pb, Zn, Sb, Ge, and the like, and $GeO_2$, $Sb_2O_3$, or a mixture of $Sb_2O_3$ and Mn(b) acetate tetrahydrate may preferably be used. The catalyst may be used in a molar ratio of 1 to 3, or 1.05 to 2.5, with respect to 1 mol of the dicarboxylic acid or a derivative thereof.

In addition, at least one of a polycondensation catalyst, a stabilizer, a coloring agent, a crystallizing agent, an antioxidant, and a branching agent may be further added in the slurry before the esterification or transesterification reaction of (a0-1) or in the product after completion of the reaction. However, the present disclosure is not limited thereto, and the above-described additive may be added at any time during the preparation of the polyester resin.

As the polycondensation catalyst, at least one of conventional titanium, germanium, antimony, aluminum, and tin-based compounds may be appropriately selected and used. Examples of the preferable titanium-based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, a titanium dioxide/silicon dioxide copolymer, a titanium dioxide/zirconium dioxide copolymer, and the like. In addition, examples of the preferable germanium-based catalyst include germanium dioxide and a copolymer thereof. An added content of the polycondensation catalyst may be 1 to 300 ppm with respect to a total weight of the final polymer (polyester resin) based on a central metal atom.

As the stabilizer, phosphorus-based compounds such as phosphoric acid, trimethyl phosphate, and triethyl phosphate may be generally used, and an added content thereof may be 10 to 5000 ppm with respect to a weight of the final polymer (polyester resin) based on phosphorus atoms. When the content of the stabilizer is less than 10 ppm, the polyester resin may not be sufficiently stabilized and a color of the polyester resin may become yellow. When the content is more than 5000 ppm, a polymer having a high degree of polymerization may not be obtained.

Further, examples of the coloring agent to be added for improving a color of the polymer may include conventional cobalt-based coloring agents such as cobalt acetate, cobalt propionate, and the like. An added content thereof may be 1 to 300 ppm with respect to a weight of the final polymer (polyester resin) based on cobalt atoms. If necessary, anthraquinone-based compounds, perinone-based compounds, azo-based compounds, methine-based compounds, and the like may be used as an organic coloring agent, and commercially available products include toners such as Polysynthren Blue RLS (manufactured by Clarient) and Solvaperm Red BB (manufactured by Clarient). An added content of the organic coloring agent may be 0 to 50 ppm with respect to a weight of the final polymer. When the coloring agent is used in the content out of the above-described range, a yellow color of the polyester resin may not be sufficiently covered or physical properties may be reduced.

Examples of the crystallizing agent may include a crystal nucleating agent, an ultraviolet absorber, a polyolefin-based resin, a polyamide resin, and the like, and an added content thereof may be 1 to 200 ppm with respect to a weight of the final polymer (polyester resin).

Examples of the antioxidant may include a hindered phenolic antioxidant, a phosphite-based antioxidant, a thioether-based antioxidant, and a mixture thereof, and an added content thereof may be 10 to 500 ppm with respect to a weight of the final polymer (polyester resin).

Examples of the branching agent may include a conventional branching agent having three or more functional groups such as trimellitic anhydride, trimethylol propane, trimellitic acid, and a mixture thereof, and an added content thereof may be 10 to 300 with respect to a weight of the final polymer (polyester resin).

Moreover, the esterification or transesterification reaction of (a0-1) for preparing the polyester resin (resin B) may be carried out at a temperature of 150 to 300° C. or 200 to 270° C., and under a pressure of 0 to 10.0 kgf/cm$^2$ (0 to 7355.6 mmHg), 0 to 5.0 kgf/cm$^2$ (0 to 3677.8 mmHg), or 0.1 to 3.0 kgf/cm$^2$ (73.6 to 2206.7 mmHg). The pressures outside the parentheses refer to gauge pressures (expressed in kgf/cm$^2$), and the pressures inside parentheses refer to absolute pressures (expressed in mmHg). When the reaction temperature and pressure are out of the above range, physical properties of the polyester resin may be lowered. The reaction time (average residence time) is usually 1 to 24 hours, or 2 to 8 hours, and may vary depending on the reaction temperature, pressure, and molar ratio of the diol to the dicarboxylic acid or the derivative thereof used.

The product obtained by the esterification or transesterification reaction of (a0-1) may be subjected to the following polycondensation reaction of (a0-2) to prepare a polyester resin having a high degree of polymerization.

The polycondensation reaction of (a0-2) may be carried out at a temperature of 150 to 300° C., 200 to 290° C., or 250 to 290° C., and under a reduced pressure of 0.01 to 400 mmHg, 0.05 to 100 mmHg, or 0.1 to 10 mmHg. Herein, the pressures refer to absolute pressures. The reduced pressure of 0.01 to 400 mmHg is for removing by-products of the polycondensation reaction such as glycol and unreacted materials such as isosorbide. Therefore, when the pressure is out of the above range, the removal of by-products and unreacted materials may be insufficient. In addition, when the temperature of the polycondensation reaction is out of the above range, physical properties of the polyester resin may be lowered. The polycondensation reaction may be carried out for the required time until the desired intrinsic viscosity is reached, for example, for an average residence time of 1 to 24 hours.

In order to reduce the content of the unreacted materials such as isosorbide remaining in the polyester resin (resin B), the unreacted raw materials may be discharged out of the system by intentionally maintaining the vacuum reaction for a long period of time at the end of the esterification reaction or the transesterification reaction or at the beginning of the polycondensation reaction, that is, in a state in which the viscosity of the resin is not sufficiently high. When the viscosity of the resin is high, it is difficult for the raw materials remaining in the reactor to flow out of the system. For example, the unreacted materials remaining in the polyester resin such as isosorbide may be removed effectively by leaving the reaction products obtained by the esterification or transesterification reaction before the polycondensation reaction for about 0.2 to 3 hours under a reduced pressure of about 400 to 1 mmHg or about 200 to 3 mmHg. Herein, a temperature of the product may be controlled to be equal to that of the esterification or transesterification reaction or that of the polycondensation reaction, or a temperature therebetween.

By adding the process of flowing out the unreacted raw materials out of the system through the control of the vacuum reaction, it is possible to reduce the content of unreacted materials such as isosorbide remaining in the polyester resin. As a result, it is possible to more effectively obtain a polyester film and a polyester resin included therein satisfying the physical properties of the embodiment.

Meanwhile, a melt intrinsic viscosity of the polymer obtained after the polycondensation reaction of (a0-2) may preferably be 0.45 to 0.65 dl/g. When the intrinsic viscosity is less than 0.45 dl/g, a reaction rate of the solid-phase polymerization reaction may be significantly lowered. When the intrinsic viscosity exceeds 0.65 dl/g, a viscosity of a molten material may be increased during the melt polymerization, and thus a possibility of polymer discoloration may be increased by shear stress between a stirrer and the reactor, resulting in by-products such as acetaldehyde.

Herein, the melt intrinsic viscosity of the polymer is a value measured at 35° C. after dissolving the polymer in ortho-chlorophenol at a concentration of 1.2 g/dl at 150° C. for 15 minutes.

Through the steps (a0-1) and (a0-2) as described above, the polyester resin (resin B) for forming a polyester film according to an embodiment of the present disclosure may be prepared.

After completion of the polycondensation reaction, the obtained polymer may be further subjected to a solid-phase polymerization reaction after crystallization to prepare a polyester resin having a uniform molecular weight distribution, and as a result, transparency in the preparation of a film may be further improved.

Accordingly, the preparation method of the polyester film according to an embodiment of the present disclosure may include, after the polycondensation reaction step of (a0-2): (a0-3) performing crystallization on the polyester resin (hereinafter referred to as polymer) obtained by the polycondensation reaction (melt polymerization); and (a0-4) performing solid-phase polymerization on the crystallized polymer so as to have an intrinsic viscosity, which is measured at 35° C. after being dissolved in ortho-chlorophenol at a concentration of 1.2 g/dl at 150° C. for 15 minutes, of 0.10 to 0.40 dl/g higher than that of the polymer obtained in the step (a0-2).

Specifically, in the crystallization step of (a0-3), the polymer obtained by the polycondensation reaction of (a0-2) is discharged out of the reactor to perform granulation. The granulation may be performed by a strand cutting method in which the polymer is extruded into a strand shape, solidified in a cooling liquid, and cut with a cutter, or an underwater cutting method in which a die hole is immersed in a cooling liquid, and the polymer is directly extruded into the cooling liquid and cut with a cutter. In general, a temperature of the cooling liquid should be kept low in the strand cutting method to solidify the strand well, so that there is no problem in cutting. In the underwater cutting method, it is preferable to maintain the temperature of the cooling liquid in accordance with the polymer to make the shape of the polymer uniform. However, in the case of a crystalline polymer, the temperature of the cooling liquid may be intentionally kept high in order to induce crystallization during the discharge.

Meanwhile, it is also possible to perform water-washing on the granulated polymer. A temperature of water during the water-washing is preferably equal to the glass transition temperature of the polymer or lower than that by about 5 to 20° C., and when the temperature of water is higher than the above-described range, it is not preferred since fusion may occur. In the case of the particles of the polymer in which the crystallization is induced during the discharge, the fusion may not occur even at a higher temperature than the glass transition temperature, so that the water temperature may be determined according to a degree of crystallization. By water-washing the granulated polymer, it is possible to remove the raw materials that are dissolved in water among the unreacted raw materials. The smaller the particle size, the wider the surface area relative to a weight of particles. Accordingly, it is advantageous for a particle size to be small. In order to achieve this purpose, the particles may be made to have an average weight of about 14 mg or less.

The granulated polymer is subjected to a crystallization step to prevent fusion during the solid-phase polymerization reaction. The crystallization step may be performed in the ambient atmosphere, an inert gas atmosphere, a water vapor atmosphere, a water vapor-containing inert gas atmosphere, or in solution, and may be performed at 110 to 180° C. or 120 to 180° C. When the temperature is low, a rate at which crystals of the particles are formed may be excessively slow. When the temperature is high, a rate at which a surface of the particles is melted may be faster than a rate at which the crystals are formed, so that the particles may adhere to each other to cause fusion. Since the heat resistance of the particles is increased as the particles are crystallized, it is also possible to crystallize the particles by dividing the crystallization into several steps and raising the temperature stepwise.

The solid-phase polymerization reaction may be performed under an inert gas atmosphere such as nitrogen, carbon dioxide, argon, and the like, or under a reduced pressure of 400 to 0.01 mmHg and at a temperature of 180 to 220° C. for an average residence time of 1 hour or more, preferably 10 hours or more. By performing the solid-phase polymerization reaction, the molecular weight may be additionally increased, and the raw materials that do not react in the melting reaction but just remain, and a cyclic oligomer, acetaldehyde, and the like that are generated during the reaction, may be removed.

The solid-phase polymerization reaction may be performed until the solid-phase intrinsic viscosity reaches a value of 0.10 to 0.40 dl/g higher than the melt intrinsic viscosity of the polymer obtained in the polycondensation reaction of (a0-2). When the difference between the intrinsic viscosity of the resin after the solid-phase polymerization reaction and the intrinsic viscosity of the resin before the solid-phase polymerization reaction is less than 0.10 dl/g, a degree of polymerization may not be sufficiently improved. When the difference exceeds 0.40 dl/g, a molecular weight distribution becomes wider, so that sufficient heat resistance may not be exhibited. In addition, a content of oligomer is relatively increased, so that it is highly likely to crystallize at a high temperature, thereby making it difficult to maintain high transparency after heat treatment.

The solid-phase polymerization reaction may be performed until the intrinsic viscosity reaches a value of 0.10 to 0.40 dl/g higher than the intrinsic viscosity of the polymer before the solid-phase polymerization reaction, which is 0.65 to 1.5 dl/g, 0.7 to 1.2 dl/g, or 0.8 to 1.0 dl/g. When the solid-phase polymerization reaction is performed until the intrinsic viscosity reaches the above range, the molecular weight distribution of the polymer may be narrowed, thereby lowering a crystallization rate during molding. Accordingly, heat resistance and crystallinity may be improved without reducing transparency. When the intrinsic viscosity of the resin after the solid-phase polymerization reaction is less than the above range, it is difficult to provide a polyester film having excellent transparency due to an increase in the crystallization rate by the low molecular weight polymer.

The polyester resin (resin B) prepared according to the above-described method has a structure in which an acid moiety derived from a dicarboxylic acid or a derivative thereof and a diol moiety derived from a diol are repeated, and includes 4 to 18 mol % of a first diol moiety derived from isosorbide with respect to 100 mol % of the total diol moiety and optionally a second diol moiety derived from cyclohexanedimethanol. When the polyester resin further includes the second diol moiety derived from cyclohexanedimethanol, the second diol moiety is included in a content satisfying the condition of Equation 1 above. Accordingly, the polyester resin may exhibit excellent heat resistance and adhesion with high light transmittance when applied to a film preparation.

The polyester film according to an embodiment of the present disclosure prepared by the above-described preparation method may be a single layer film composed of a resin layer formed from a mixture comprising the polyethylene terephthalate and the polyester resin in an optimum mixing ratio.

Accordingly, the polyester film may exhibit high transparency, and in particular, haze measured according to ASTM D1003-97 may be 3% or less, 2% or less, 1.5% or less, 1% or less, or 0.5% or less, when the polyester film is an unstretched film having a thickness of 1 mm or a stretched film having a thickness of 200 μm. A lower limit of the haze is not particularly limited, and may be 0%.

In addition, the polyester film may exhibit excellent heat resistance, and specifically, tan delta may be 88° C. or more, or 88 to 100° C. in the case of an unstretched film. As a result, it can be easily used in a printing process applied at a temperature of about 80° C. In the case of a stretched film, the tan delta may be 110° C. or more, or 110 to 130° C., so that a printing process at a higher temperature is possible.

Usually, the heat resistance can be evaluated from the glass transition temperature measured using differential scanning calorimetry (DSC). However, if DSC is not available due to the nature of a sample, Young's modulus or storage modulus (E') and loss modulus (E") are measured using dynamic mechanical analysis (DMA) or thermomechanical analysis (TMA), and then the tan delta is calculated from them to obtain the glass transition temperature. Accordingly, in the present disclosure, the tan delta is calculated using DMA, and heat resistance is evaluated based on this. Specifically, the polyester film is cut into a size of 30 mm×5.3 mm (longitudinal length×transverse length) to prepare a specimen, and E' and E" are measured under the following conditions using DMA, respectively. Thereafter, the tan delta can be calculated according to the following Equation 4.

<Measuring Conditions>

Frequency fixed (Frequency sweep/Amplitude: 15 μm)
Temperature change: temperature increases at a rate of 3° C./min from room temperature (RT) up to 150° C.

$$\text{Tan delta} = E'/E'' \quad \text{[Equation 4]}$$

If the tan delta is 100° C. or more, or more specifically 110° C. or more, it may be determined as 'excellent heat resistance'.

In addition, the polyester film may exhibit low strain due to excellent heat resistance. Specifically, when the polyester film is an unstretched film having a thickness of 1 mm or a stretched film having a thickness of 200 μm, the strain at 100° C. may be 3% or less, or 1 to 3%.

In the present disclosure, the strain (%) can be calculated by a Creep TTS test using dynamic mechanical analysis (DMA) and time-temperature superposition (TTS). Specifically, in the Creep TTS test, the polyester film is heated up from room temperature (RT), and when the temperature reaches 100° C., a stress of 10 MPa is applied to the film under an isothermal condition for 10 minutes. Thereafter, the length of the film deformed due to the stress applied at 100° C. relative to the length of the film before stress application is converted into strain (%) according to the following Equation 5.

$$\text{Strain (\%)} = \left[ \left( \frac{\text{length of polyester film after stress application at 100° C.} - \text{length of polyester film before stress application}}{\text{length of polyester film before stress application}} \right) \right] \times 100 \quad \text{[Equation 5]}$$

When the strain at 100° C. exceeds 3%, the degree of deformation can be visually identified. Accordingly, the strain at 100° C. of 3% or less is evaluated as 'excellent heat resistance'.

In addition, the polyester film may exhibit excellent adhesion, and in particular, may exhibit excellent adhesion to paper.

As described above, the polyester film according to an embodiment of the present disclosure may be applied in various fields due to its excellent heat resistance, transparency, and adhesion. In particular, the polyester film may be useful for optical films requiring high transparency, food container films or printing films requiring excellent heat resistance and chemical resistance, and adhesive films or packaging films requiring high adhesion and heat sealability.

Hereinafter, action and effects of the present invention are described by specific examples of the present invention in more detail. However, these examples are provided by way of example, and therefore should not be construed as limiting the scope of the present invention.

The following physical properties were measured according to the following methods.

(1) Intrinsic Viscosity (IV)

After dissolving a sample in ortho-chlorophenol (o-chlorophenol) at a concentration of 1.2 g/dl at 150° C. for 15 minutes, the intrinsic viscosity of the sample was measured using an Ubbelohde viscosity tube. Specifically, a temperature of the viscosity tube was maintained at 35° C., and the time taken (efflux time; to) for a solvent (ortho-chlorophenol) to pass between certain internal sections of the viscosity tube and the time taken (t) for a solution prepared by dissolving the sample in the solvent to pass the tube were measured. Subsequently, a specific viscosity ($\eta_{sp}$) was calculated by substituting to and t into Equation 2, and the intrinsic viscosity was calculated by substituting the calculated specific viscosity into Equation 3.

$$\eta_{sp} = \frac{t - t_0}{t_0} \quad \text{[Equation 2]}$$

$$[\eta] = \frac{\sqrt{1 + 4A\eta_{sp}} - 1}{2Ac} \quad \text{[Equation 3]}$$

In Equation 3, A is a Huggins constant of 0.247, and c is a concentration of 1.2 g/dl.

In the case of a melt intrinsic viscosity, the polymer obtained after the polycondensation reaction was used as a sample, and in the case of a solid-phase intrinsic viscosity, the polymer obtained after the crystallization and the solid-phase polymerization reaction was used as a sample.

(2) Contents of Diol Moieties Derived from Isosorbide (ISB) and 1,4-Cyclohexanedimethanol (CHDM)

The content of a first diol moiety derived from isosorbide (ISB) and the content of a second diol moiety derived from 1,4-cyclohexanedimethanol (CHDM) were confirmed by a 1H-NMR spectrum obtained at 25° C. using a nuclear magnetic resonance apparatus (JEOL, 600 MHz FT-NMR) after a sample of the finally prepared polyester resin was dissolved in a deuterated chloroform ($CDCl_3$) solvent at a concentration of 3 mg/mL.

(3) Film Thickness

A cross-section of the polyester film prepared in one of the examples and comparative examples was observed with an optical microscope. After confirming the thickness at various positions, their average value was determined as the film thickness.

(4) Tan Delta

In order to evaluate the heat resistance of the polyester film, the polyester film prepared in one of the examples and comparative examples was cut into a size of 30 mm×5.3 mm (longitudinal length×transverse length) to prepare a specimen, and Young's modulus (E') and loss modulus (E") were measured under the following conditions using DMA, respectively. Thereafter, the tan delta was calculated according to the following Equation 4.

<Measuring Conditions>

Frequency fixed (Frequency sweep/Amplitude: 15 μm)

Temperature change: temperature increased at a rate of 3° C./min from room temperature (RT) up to 150° C.

$$\text{Tan delta} = E'/E'' \quad \text{[Equation 4]}$$

If the tan delta is 100° C. or more, or more specifically 110° C. or more, it may be determined as 'excellent heat resistance'.

(5) Strain

When a stress is applied to a specimen, deformation corresponding to the stress occurs in the specimen, and even if the specimen is subjected to a constant stress, a creep phenomenon in which the specimen gradually deforms over time occurs.

Thus, in order to predict the deformation according to a temperature of the polyester film prepared in one of the examples and comparative examples, a Creep TTS test was performed using dynamic mechanical analysis (DMA) and time-temperature superposition (TTS).

Specifically, in the Creep TTS test, a specimen having a size of 30 mm×5.3 mm (longitudinal length×transverse length) of the polyester film prepared in one of the examples and comparative examples was heated up from room temperature (RT), and when the temperature reached 90° C., 100° C., and 110° C., a stress of 10 MPa was applied to the specimen under an isothermal condition for 10 minutes, respectively. Thereafter, the length of the specimen deformed due to the stress applied at 90° C., 100° C., or 110° C. relative to the length of the specimen before the stress application was converted into strain (%) according to Equation 6 below.

$$\text{Strain (\%)} = \left[ \frac{\left(\begin{array}{c}\text{length of specimen of polyester film after stress application at}\\ 90° \text{ C., } 100° \text{ C., or } 110° \text{ C.} -\\ \text{length of specimen of polyester film before stress application}\end{array}\right)}{\text{length of specimen of polyester film before stress application}} \right] \times 100 \quad \text{[Equation 6]}$$

For example, the strain at 100° C. can be calculated by substituting the length of the specimen of the polyester film deformed by the stress of 10 MPa applied at 100° C. under an isothermal condition for 10 minutes into the 'length of specimen of polyester film after stress application at 100° C.' in Equation 6 (see Equation 5 above).

As a result of confirming the deformation according to the temperature of 90° C., 100° C., and 110° C., the strain was smaller at 90° C. than 100° C., and higher at 110° C. than 100° C. Thus, heat resistance was evaluated based on the strain value at 100° C. When the strain at 100° C. exceeds 3%, the degree of deformation can be visually identified. Accordingly, the strain at 100° C. of 3% or less was evaluated as 'excellent heat resistance'.

(6) Adhesion

Using a heat gradient tester, the polyester film prepared in one of the examples and comparative examples was placed between papers, and then bonded at 230° C. for 3 seconds to confirm and evaluate the adhesion with the paper according to the following criteria.

O: Bonded

X: Not bonded (7) Haze

The polyester film prepared in one of the examples and comparative examples was cut into a size of 10 cm×10 cm (longitudinal length×transverse length) to prepare a specimen. Parallel transmittance and diffuse transmittance of the specimen were measured using CM-3600A equipment manufactured by Minolta according to ASTM D1003-97. The transmittance is defined as a sum of the parallel transmittance and the diffuse transmittance, and the haze is defined as a percentage of the diffuse transmittance to the transmittance (haze=diffuse transmittance/transmittance× 100). Therefore, the haze was calculated from the parallel transmittance and the diffuse transmittance of the specimen.

The haze of 3 or less was evaluated as 'excellent transparency'.

<Preparation of Polyester Resin>

Preparation Example 1

3257.4 g (19.6 mol) of terephthalic acid (TPA), 1180.1 g (19.0 mol) of ethylene glycol (EG), and 229.2 g (1.6 mol) of isosorbide (ISB) were placed in a 10 L reactor to which a column and a condenser capable of being cooled by water were connected, but the contents were adjusted such that a diol moiety derived from ISB introduced into the final polyester resin was 5 mol % with respect to a total diol moiety. 1.0 g of $GeO_2$ (molar ratio of $GeO_2$/TPA=1.05) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.55 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.70 dl/g.

A content of an acid moiety derived from TPA with respect to a total acid moiety contained in the obtained polyester resin was 100 mol %, and a content of a diol moiety derived from ISB with respect to a total diol moiety was 5 mol %.

Preparation Example 2

3354.8 g (20.2 mol) of terephthalic acid (TPA), 1403.4 g (22.6 mol) of ethylene glycol (EG), and 531.1 g (3.6 mol) of isosorbide (ISB) were placed in a 10 L reactor to which a column and a condenser capable of being cooled by water were connected, but the contents were adjusted such that a diol moiety derived from ISB introduced into the final polyester resin was 10 mol % with respect to a total diol moiety. 1.0 g of $GeO_2$ (molar ratio of $GeO_2$/TPA=1.3) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 270° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.50 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were stored in water at 70° C. for 5 hours, allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.75 dl/g.

Preparation Example 3

3110.9 g (18.7 mol) of terephthalic acid (TPA), 1161.9 g (18.7 mol) of ethylene glycol (EG), and 820.8 g (5.6 mol) of isosorbide (ISB) were placed in a 10 L reactor to which a column and a condenser capable of being cooled by water were connected, but the contents were adjusted such that a diol moiety derived from ISB introduced into the final polyester resin was 16 mol % with respect to a total diol moiety. 1.0 g of $GeO_2$ (molar ratio of $GeO_2$/TPA=1.3) as a catalyst, 1.46 g of phosphoric acid as a stabilizer, 0.015 g of blue toner (Polysynthren™ Blue RLS, manufactured by Clarient), 0.004 g of red toner (Solvaperm™ Red BB, manufactured by Clarient), 1 ppm of polyethylene as a crystallizing agent, 100 ppm of an antioxidant (Iganox™ 1076), and 100 ppm of trimellitic anhydrate as a branching agent were used. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 275° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.60 dl/g. When the intrinsic viscosity of the reaction product reached a desired level, the reaction product was discharged out of the reactor and stranded. This was solidified with a cooling liquid and granulated to have an average weight of about 12 to 14 mg.

Preparation Example 4

3775.4 g (19.5 mol) of dimethyl terephthalate (DMT), 2654.5 g (42.8 mol) of ethylene glycol (EG), and 852.4 g (5.8 mol) of isosorbide (ISB) were placed in a 10 L reactor to which a column and a condenser capable of being cooled by water were connected, but the contents were adjusted such that a diol moiety derived from ISB introduced into the final polyester resin was 10 mol % with respect to a total diol moiety. 1.5 g of Mn(II) acetate tetrahydrate and 1.8 g of $Sb_2O_3$ (molar ratio of (Mn(II) acetate tetrahydrate+$Sb_2O_3$)/DMT=2.5) were used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 240° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 265° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.50 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.75 dl/g.

Preparation Example 5

3226.4 g (19.4 mol) of terephthalic acid (TPA), 169.8 g (1.0 mol) of isophthalic acid (IPA), 1420.7 g (22.9 mol) of ethylene glycol (EG), and 537.7 g (3.7 mol) of isosorbide (ISB) were placed in a 10 L reactor to which a column and a condenser capable of being cooled by water were connected, but the contents were adjusted such that a diol moiety derived from ISB introduced into the final polyester resin was 10 mol % with respect to a total diol moiety. 1.0 g of $GeO_2$ (molar ratio of $GeO_2$/(TPA+IPA)=1.3) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.50 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.75 dl/g.

Preparation Example 6

3112.7 g (18.8 mol) of terephthalic acid (TPA), 1209.1 g (19.5 mol) of ethylene glycol (EG), 162.0 g (1.1 mol) of cyclohexanedimethanol (CHDM), and 547.4 g (3.8 mol) of isosorbide (ISB) were placed in a 10 L reactor to which a column and a condenser capable of being cooled by water were connected, but the contents were adjusted such that a diol moiety derived from ISB and a diol moiety derived from CHDM introduced into the final polyester resin were 10 mol % and 6 mol %, respectively, with respect to a total diol moiety. 1.0 g of $GeO_2$ (molar ratio of $GeO_2$/TPA=1.05) was used as a catalyst, 1.46 g of phosphoric acid was used as a stabilizer, and 0.9 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 270° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.70 dl/g. When the intrinsic viscosity of the reaction product reached a desired level, the reaction product was discharged out of the reactor and stranded. This was solidified with a cooling liquid and granulated to have an average weight of about 12 to 14 mg.

Comparative Preparation Example 1

3456.2 g (20.8 mol) of terephthalic acid (TPA), 1536.1 g (24.8 mol) of ethylene glycol (EG), and 182.4 g (1.2 mol) of isosorbide (ISB) were placed in a 10 L reactor to which a column and a condenser capable of being cooled by water were connected, but the contents were adjusted such that a diol moiety derived from ISB introduced into the final polyester resin was 3 mol % with respect to a total diol moiety. 1.0 g of $GeO_2$ (molar ratio of $GeO_2$/TPA=1.25) was used as a catalyst, 1.46 g of phosphoric acid was used as a stabilizer, and 0.7 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.55 dl/g. When the intrinsic viscosity of the reaction product reached a desired level, the reaction product was discharged out of the reactor and stranded. This was solidified with a cooling liquid and granulated to have an average weight of about 12 to 14 mg.

The particles were allowed to stand at 150° C. under a nitrogen atmosphere for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity (solid-phase IV) of the particles in the reactor reached 0.70 dl/g.

Comparative Preparation Example 2

2988.9 g (18.0 mol) of terephthalic acid (TPA), 1228.0 g (19.8 mol) of ethylene glycol (EG), and 777.8 g (5.4 mol) of cyclohexanedimethanol (CHDM) were placed in a 10 L reactor to which a column and a condenser capable of being cooled by water were connected, but the contents were adjusted such that a diol moiety derived from CHDM introduced into the final polyester resin was 30 mol % with respect to a total diol moiety. 0.7 g of $GeO_2$ (molar ratio of $GeO_2/TPA=1.4$) was used as a catalyst, 1.2 g of phosphoric acid was used as a stabilizer, and 0.5 g of cobalt acetate was used as a coloring agent. Then, nitrogen was injected into the reactor to form a pressurized state in which the pressure of the reactor was higher than normal pressure by 2.0 $kgf/cm^2$.

In addition, the temperature of the reactor was raised to 255° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 275° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.80 dl/g. When the intrinsic viscosity of the reaction product reached a desired level, the reaction product was discharged out of the reactor and stranded. This was solidified with a cooling liquid and granulated to have an average weight of about 12 to 14 mg.

Comparative Preparation Example 3

3060.8 g (18.4 mol) of terephthalic acid (TPA), 971.7 g (15.7 mol) of ethylene glycol (EG), and 1076.8 g (7.4 mol) of isosorbide (ISB) were placed in a 10 L reactor to which a column and a condenser capable of being cooled by water were connected, but the contents were adjusted such that a diol moiety derived from ISB introduced into the final polyester resin was 20 mol % with respect to a total diol moiety. 1.0 g of $GeO_2$ (molar ratio of $GeO_2/TPA=1.25$) was used as a catalyst, 1.46 g of phosphoric acid was used as a stabilizer, and 0.017 g of blue toner (Polysynthren™ Blue RLS, manufactured by Clarient) and 0.006 g of red toner (Solvaperm™ Red BB, manufactured by Clarient) were used. Then, nitrogen was injected into the reactor to form a pressurized state in which the pressure of the reactor was higher than normal pressure by 1.0 $kgf/cm^2$.

In addition, the temperature of the reactor was raised to 265° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 280° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.60 dl/g. When the intrinsic viscosity of the reaction product reached a desired level, the reaction product was discharged out of the reactor and stranded. This was solidified with a cooling liquid and granulated to have an average weight of about 12 to 14 mg.

Comparative Preparation Example 4

3156.2 g (19.0 mol) of terephthalic acid (TPA), 730.9 g (11.8 mol) of ethylene glycol (EG), 684.5 g (4.8 mol) of cyclohexanedimethanol (CHDM), and 499.7 g (3.4 mol) of isosorbide (ISB) were placed in a 10 L reactor to which a column and a condenser capable of being cooled by water were connected, but the contents were adjusted such that a diol moiety derived from ISB and a diol moiety derived from CHDM introduced into the final polyester resin were 10 mol % and 25 mol %, respectively, with respect to a total diol moiety. 1.0 g of $GeO_2$ (molar ratio of $GeO_2/TPA=1.05$) was used as a catalyst, 1.46 g of phosphoric acid was used as a stabilizer, and 0.9 g of cobalt acetate was used as a coloring agent. Then, nitrogen was injected into the reactor to form a pressurized state in which the pressure of the reactor was higher than normal pressure by 1.0 $kgf/cm^2$.

In addition, the temperature of the reactor was raised to 260° C., maintained at the same temperature, and an esterification reaction proceeded until the mixture in the reactor became transparent. In this process, unreacted ISBs and by-products flowed out through the column and the condenser. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the temperature of the reactor was raised to 270° C. over 1 hour, and a polycondensation reaction proceeded while maintaining the pressure of the reactor at 1 Torr or less. The polycondensation reaction proceeded until an intrinsic viscosity (melt IV) of the reaction product in the reactor became 0.70 dl/g. When the intrinsic viscosity of the reaction product reached a desired level, the reaction product was discharged out of the reactor and stranded. This was solidified with a cooling liquid and granulated to have an average weight of about 12 to 14 mg.

The intrinsic viscosity (IV) and the contents of diol moieties derived from ISB and CHDM were measured for the polyester resins prepared in preparation examples and comparative preparation examples, respectively. The results are shown in Table 1 below.

TABLE 1

|  | Preparation Example | | | | | | Comparative Preparation Example | | | |
| --- | --- | --- | --- | --- | --- | --- | --- | --- | --- | --- |
|  | 1 | 2 | 3 | 4 | 5 | 6 | 1 | 2 | 3 | 4 |
| Melt IV[1] (dl/g) | 0.55 | 0.50 | 0.60 | 0.50 | 0.50 | 0.60 | 0.55 | 0.80 | 0.60 | 0.70 |
| Solid-phase IV[2] (dl/g) | 0.70 | 0.75 | ND | 0.75 | 0.75 | ND | 0.70 | ND | ND | ND |
| ISB content[3] (mol %) | 5 | 10 | 16 | 10 | 10 | 10 | 3 | 0 | 20 | 10 |
| CHDM content[4] (mol %) | 0 | 0 | 0 | 0 | 0 | 6 | 0 | 30 | 0 | 25 |

The term "ND" in Table 1 above means that the solid-phase intrinsic viscosity (IV) was not measured since the crystallization and the solid-phase polymerization reaction were not performed after the polycondensation reaction in the preparation of the polyester resin.

In Table 1 above, the intrinsic viscosity (IV) and the contents of diol moieties are as follow:

1) Melt IV: an intrinsic viscosity of the reaction product obtained after the polycondensation reaction in the preparation of the polyester resin.
2) Solid-phase IV: an intrinsic viscosity of the reaction product obtained by the crystallization and solid-phase polymerization reaction after the polycondensation reaction in the preparation of the polyester resin.
3) ISB content: a molar ratio of a diol moiety derived from isosorbide (ISB) with respect to 100 mol % of a total diol moiety derived from the total diol contained in the final polyester resin.
4) CHDM content: a molar ratio of a diol moiety derived from cyclohexanedimethanol (CHDM) with respect to 100 mol % of a total diol moiety derived from the total diol contained in the final polyester resin.

<Preparation of Polyester Film>

Example 1

Polyethylene terephthalate (SKYPET™ BL8050 Grade, melting point of 255° C., manufactured by SK chemicals) and the polyester resin prepared in Preparation Example 1 were added to an extruder in a weight ratio of 70:30, and melted at a temperature of 250 to 300° C.

Then, the polyester resin was extruded through a die and an unstretched polyester sheet was produced. Subsequently, the unstretched polyester sheet was stretched in a longitudinal direction at a stretch ratio of 1 time and in a transverse direction at a stretch ratio of 1 time, followed by heat setting at 100 to 220° C. This was wound up to obtain a polyester film having a thickness of 1 mm.

Examples 2 to 5

A polyester film having a thickness of 1 mm was prepared in the same manner as in Example 1, except that each resin was blended and the stretching was performed as shown in Table 2 below.

Examples 6 to 11

A polyester film having a thickness of 200 μm was prepared in the same manner as in Example 1, except that each resin was blended and the stretching was performed as shown in Table 2 below.

Example 12

After polyethylene terephthalate and the polyester resin prepared in Preparation Example 3 were added to an extruder in a weight ratio of 65:35, 200 ppm of polyethylene (prepared in the form of a master batch (m/B)) was added thereto as a crystallizing agent with respect to a total weight of the polyethylene terephthalate and the polyester resin, and then melted at a temperature of 250 to 300° C.

Then, the polyester resin was extruded through a die and an unstretched polyester sheet was produced. Subsequently, the unstretched polyester sheet was stretched in a longitudinal direction at a stretch ratio of 2.5 times and in a transverse direction at a stretch ratio of 3 times, followed by heat setting. This was wound up to obtain a polyester film having a thickness of 200 μm.

Example 13

A polyester film having a thickness of 200 μm was prepared in the same manner as in Example 12, except that each resin and each additive were blended and the stretching was performed as shown in Table 2 below.

Examples 14 and 15

A polyester film having a thickness of 200 μm was prepared in the same manner as in Example 1, except that each resin was blended and the stretching was performed as shown in Table 2 below.

Example 16

A polyester film having a thickness of 1 mm was prepared in the same manner as in Example 1, except that each resin and each additive were blended and the stretching was performed as shown in Table 2 below.

Example 17

A polyester film having a thickness of 200 μm was prepared in the same manner as in Example 1, except that each resin and each additive were blended and the stretching was performed as shown in Table 2 below.

Comparative Example 1

Only 100 parts by weight of polyethylene terephthalate (SKYPET™ BL8050 Grade, manufactured by SK Chemicals) was added to an extruder, and melted at a temperature of 250 to 300° C.

Then, the polyester resin was extruded through a die and an unstretched polyester sheet was produced. Subsequently, the unstretched polyester sheet was stretched in a longitudinal direction at a stretch ratio of 1 time and in a transverse direction at a stretch ratio of 1 time, followed by heat setting. This was wound up to obtain a polyester film.

Comparative Examples 2 to 10

A polyester film was prepared in the same manner as in Example 1, except that each resin was blended and the stretching was performed as shown in Table 3 below.

TABLE 2

| | | Example No. | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Resin A | | PET | PET | PET | PET | PET | PET | PET | PET | PET | PET | PET | PET | PET | PET | PET | PET | PET |
| Resin B | | Preparation Example 1 | Preparation Example 2 | Preparation Example 3 | Preparation Example 3 | Preparation Example 2 | Preparation Example 1 | Preparation Example 2 | Preparation Example 3 | Preparation Example 2 | Preparation Example 2 | Preparation Example 3 | Preparation Example 3 | Preparation Example 3 | Preparation Example 4 | Preparation Example 5 | Preparation Example 6 | Preparation Example 6 |
| Mixing weight ratio of A:B | | 70:30 | 80:20 | 90:10 | 10:90 | 30:70 | 50:50 | 80:20 | 10:90 | 30:70 | 60:40 | 85:15 | 65:35 | 65:35 | 80:20 | 80:20 | 30:70 | 30:70 |
| Additive (content*) | | — | — | — | — | — | — | — | — | — | — | — | Crystallizing agent (200 ppm) | Crystallizing agent (100 ppm) | — | — | — | — |
| Stretching process | Stretch ratio in MD | 1 | 1 | 1 | 1 | 1 | 1 | 2 | 3 | 2 | 3 | 2 | 2.5 | 2 | 2 | 3 | 1 | 2.5 |
| | Stretch ratio in TD | 1 | 1 | 1 | 1 | 1 | 5 | 3 | 2 | 3 | 4 | 3 | 3 | 3 | 2 | 3 | 1 | 2.5 |
| | Total stretch ratio | 1 | 1 | 1 | 1 | 1 | 5 | 6 | 6 | 6 | 12 | 6 | 7.5 | 6 | 4 | 9 | 1 | 6.25 |

TABLE 3

| | | Comparative Example No. | | | | | | | | | |
|---|---|---|---|---|---|---|---|---|---|---|---|
| | | 1 | 2 | 3 | 4 | 5 | 6 | 7 | 8 | 9 | 10 |
| Resin A | | PET | PET | PET | PET | PET | PET | PET | PET | PET | PET |
| Resin B | | — | Comparative Preparation Example 1 | Comparative Preparation Example 2 | Comparative Preparation Example 3 | — | Comparative Preparation Example 1 | Comparative Preparation Example 2 | Comparative Preparation Example 2 | Preparation Example 3 | Preparation Example 1 |
| Mixing weight ratio of A:B | | 100:0 | 80:20 | 80:20 | 80:20 | 100:0 | 75:25 | 80:20 | 80:20 | 5:95 | 95:5 |
| Additive (content*) | | — | — | — | — | — | — | — | — | — | — |
| Stretching process | Stretch ratio in MD | 1 | 1 | 1 | 1 | 2 | 3 | 3 | 3 | 2 | 1 |
| | Stretch ratio in TD | 1 | 1 | 1 | 1 | 3 | 4 | 4 | 4 | 3 | 1 |
| | Total stretch ratio | 1 | 1 | 1 | 1 | 6 | 12 | 12 | 12 | 6 | 1 |

In Tables 2 and 3 above, the content of the additive is in weight units with respect to a total weight of the resins A and B. In the case of Comparative Examples 7 and 8 of Table 3 above, the stretching process was attempted at a stretch ratio described above, but the stretching orientation was impossible, since amorphousness was increased due to the high content of diol moieties derived from ISB and CHDM included in the polyester resin.

Experimental Example: Evaluation of Physical Properties of Polyester Stretched Film The physical properties of the polyester resins prepared in Examples 1 to 17 and Comparative Examples 1 to 10 were evaluated according to the methods described above, and the results are shown in Tables 4 and 5. However, Comparative Examples 7 and 8 were unable to be evaluated in terms of the physical properties, since the stretched film was not prepared.

ethylene terephthalate is mixed with a polyester resin satisfying the above conditions, the adhesion could still not be achieved regardless of stretching when the content of a diol moiety derived from ISB in the polyester resin is low or the content of the polyester resin to be mixed is not sufficient.

Meanwhile, when the content of a diol moiety derived from ISB in the polyester resin is high or the content of the polyester resin to be mixed is sufficient, it is possible to achieve the adhesion due to the decrease in crystallinity. However, when the content of a diol moiety derived from ISB in the polyester resin was too high as in Comparative Example 4, the strain was rather increased and the haze characteristics were decreased. In addition, when the content of the polyester resin to be mixed was too high as in Comparative Example 9, the strain was increased.

In addition, referring to the results of Comparative Example 3, when the polyester resin did not include the diol moiety derived from ISB, the heat resistance and haze characteristics were lowered and the strain was increased. It

TABLE 4

| | Example No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Film thickness | 1 mm | 1 mm | 1 mm | 1 mm | 1 mm | 200 μm | 200 μm | 200 μm | 200 μm | 200 μm | 200 μm | 200 μm | 200 μm | 200 μm | 200 μm | 1 mm | 200 μm |
| Tan delta (° C.) | 88 | 90 | 97 | 97 | 95 | 112 | 115 | 112 | 110 | 120 | 120 | 121 | 122 | 115 | 115 | 95 | 95 |
| strain (%) | 2 | 3 | 3 | 3 | 3 | 2 | 2 | 3 | 3 | 1 | 2.5 | 2.5 | 2.5 | 2 | 2 | 3 | 3 |
| Adhesion | ○ | ○ | ○ | ○ | ○ | ○ | ○ | ○ | ○ | ○ | ○ | ○ | ○ | ○ | ○ | ○ | ○ |
| Haze | 3 | 2 | 1 | 0.5 | 0.5 | 2 | 2 | 0.5 | 0.5 | 1.5 | 1.5 | 2 | 1.5 | 2 | 2 | 0.5 | 0.5 |

TABLE 5

| | Comparative Example No. | | | | | | | | | |
|---|---|---|---|---|---|---|---|---|---|---|
| | 1 | 2 | 3 | 4 | 5 | 6 | 7 | 8 | 9 | 10 |
| Film thickness | 1 mm | 1 mm | 1 mm | 1 mm | 200 μm | 200 μm | 200 μm | 200 μm | 200 μm | 200 μm |
| Tan delta (° C.) | 85 | 86 | 85 | 100 | 100 | 108 | N.D. | N.D. | 97 | 110 |
| strain (%) | 2 | 2 | 10 | 15 | 2 | 2 | N.D. | N.D. | 10 | 2 |
| Adhesion | X | X | ○ | ○ | X | X | N.D. | N.D. | ○ | X |
| Haze | 10 | 5 | 20 | 15 | 2 | 5 | N.D. | N.D. | 1 | 5 |

In Table 5, the term "N.D." means that the measurement was impossible.

From the above experimental results, it can be confirmed that the polyester films of the examples and comparative examples showed a difference in physical properties depending on the type of resin at the same thickness. It can be also confirmed that the polyester films of Examples prepared by mixing the polyester resin (resin B) with polyethylene terephthalate in an optimum weight ratio exhibited significantly improved transparency and adhesion with excellent heat resistance as compared with the comparative examples, wherein the polyester resin (resin B) included 18 mol % or less of a diol moiety derived from at least one of ISB and CHDM, and 4 to 18 mol % of a diol moiety derived from ISB with respect to 100 mol % of a diol moiety derived from the diol in the polyester resin.

Specifically, it can be confirmed from the results of Comparative Examples 1 and 5 prepared by using the polyethylene terephthalate alone that although the heat resistance and haze characteristics could be further improved through the stretching process, adhesion was not exhibited due to high crystallinity of the polyethylene terephthalate.

In addition, it can be confirmed from the results of Comparative Examples 2, 6, and 10 that even if the polycan also be confirmed from the results of Comparative Example 9 that the stretching process was impossible due to the increased amorphousness.

Referring to the results of Comparative Example 7, even if the polyester resin included the diol moiety derived from ISB, the stretching process was impossible due to the increase in amorphousness when the total content of the diol moiety derived from ISB and CHDM was too high.

From these results, it can be confirmed that the mixing ratio of the polyester resin and the polyethylene terephthalate and the content conditions of the diol moieties derived from ISB and CHDM in the polyester resin should be simultaneously controlled in order to improve heat resistance, adhesion, and transparency in the present disclosure.

The polyester stretched film according to the embodiment of the present disclosure including the polyester resin in which the contents of the diol moieties derived from ISB and CHDM are controlled and polyethylene terephthalate in an optimum mixing ratio exhibited heat resistance and transparency with excellent adhesion, and is expected to be useful in various applications such as industrial films, food container films, packaging films, optical films, insulating films, printing films, and adhesive films.

The invention claimed is:

1. A preparation method of the polyester film, comprising a step of
mixing polyethylene terephthalate and a polyester resin in a weight ratio of 90:10 to 10:90, followed by melt extrusion to prepare a polyester film comprising a resin layer formed from the polyethylene terephthalate and the polyester resin,
wherein the polyethylene terephthalate is different from the polyester resin, and the polyester resin has a structure in which an acid moiety derived from a dicarboxylic acid or a derivative thereof and a diol moiety derived from a diol are repeated, and is characterized in that a content of a first diol moiety (a) derived from isosorbide and a content of a second diol moiety (b) derived from cyclohexanedimethanol with respect to 100 mol % of a total diol moiety derived from the diol satisfy the following Equation 1:

$$b \leq 18 \text{ mol }\% - a \quad \text{[Equation 1]}$$

in the above Equation, a is a content (mol %) of a first diol moiety derived from isosorbide and is 4 to 18 mol % with respect to 100 mol % of a total diol moiety derived from the diol in the polyester resin, and b is a content (mol %) of a second diol moiety derived from cyclohexanedimethanol.

2. The preparation method of the polyester film of claim 1, further comprising a step of stretching the polyester film in at least one of a longitudinal direction and a transverse direction after the preparation of the polyester film.

3. The preparation method of the polyester film of claim 2, wherein the stretching is performed by biaxially stretching the polyester film in a longitudinal direction at a stretch ratio of 2 to 5 times and in a transverse direction at a stretch ratio of 2 to 7 times.

4. The preparation method of the polyester film of claim 2, further comprising a step of heat setting the stretched polyester film at 100 to 220° C. after the stretching step.

5. The preparation method of the polyester film of claim 1, further comprising:
before mixing the polyethylene terephthalate and the polyester resin in the step of preparing the polyester film,
(a0-1) performing an esterification reaction or a transesterification reaction on a dicarboxylic acid or a derivative thereof and a diol; and
(a0-2) performing a polycondensation reaction on a product obtained by the esterification or transesterification reaction to prepare a polyester resin having an intrinsic viscosity of 0.45 to 0.65 dl/g at 35° C. after being dissolved in ortho-chlorophenol at a concentration of 1.2 g/dl at 150° C. for 15 minutes.

6. The preparation method of the polyester film of claim 5, further comprising:
after the step (a0-2) and before the step (a),
(a0-3) performing crystallization on a polymer obtained by the polycondensation reaction; and
(a0-4) performing solid-phase polymerization on the crystallized polymer so as to have an intrinsic viscosity, which is measured at 35° C. after being dissolved in ortho-chlorophenol at a concentration of 1.2 g/dl at 150° C. for 15 minutes, of 0.10 to 0.40 dl/g higher than that of the polymer obtained in the step (a0-2).

* * * * *